United States Patent
Choi et al.

(10) Patent No.: US 11,314,650 B2
(45) Date of Patent: Apr. 26, 2022

(54) OPERATING METHOD OF MEMORY SYSTEM THAT CHECKS STORED DATA THAT IS REUSED AND GENERATING A FLAG/BIT SIGNAL

(71) Applicant: SK hynix Inc., Icheon-si (KR)

(72) Inventors: Won-Ha Choi, Icheon-si (KR); Joon-Yong Choi, Uiwang-si (KR)

(73) Assignee: SK hynix Inc., Icheon-si (KR)

( * ) Notice: Subject to any disclaimer, the term of this patent is extended or adjusted under 35 U.S.C. 154(b) by 239 days.

(21) Appl. No.: 16/718,558

(22) Filed: Dec. 18, 2019

(65) Prior Publication Data

US 2020/0293451 A1 Sep. 17, 2020

(30) Foreign Application Priority Data

Mar. 15, 2019 (KR) .......... 10-2019-0029885

(51) Int. Cl.
| | |
|---|---|
| *G06F 12/0871* | (2016.01) |
| *G06F 12/02* | (2006.01) |
| *G06F 13/16* | (2006.01) |
| *G06F 9/54* | (2006.01) |
| *G06F 9/48* | (2006.01) |
| *G06F 11/07* | (2006.01) |

(52) U.S. Cl.
CPC .......... *G06F 12/0871* (2013.01); *G06F 9/485* (2013.01); *G06F 9/542* (2013.01); *G06F 9/546* (2013.01); *G06F 11/076* (2013.01); *G06F 11/0772* (2013.01); *G06F 12/0238* (2013.01); *G06F 13/1673* (2013.01); *G06F 2212/7209* (2013.01)

(58) Field of Classification Search
CPC ...... G06F 12/0871; G06F 9/485; G06F 9/542; G06F 9/546; G06F 11/076; G06F 11/0772; G06F 12/0238; G06F 13/1673
See application file for complete search history.

(56) References Cited

U.S. PATENT DOCUMENTS

| | | | |
|---|---|---|---|
| 10,599,485 B2 * | 3/2020 | Levandoski | ........ G06F 12/0238 |
| 10,970,805 B2 * | 4/2021 | Li | ........... G06F 9/3836 |
| 2010/0118041 A1 * | 5/2010 | Chen | .................... G06F 12/1081 |
| | | | 345/542 |

FOREIGN PATENT DOCUMENTS

| | | |
|---|---|---|
| KR | 10-2009-0058232 A | 6/2009 |
| KR | 10-1741598 B1 | 3/2015 |

* cited by examiner

*Primary Examiner* — Tammara R Peyton

(57) ABSTRACT

A data processing system includes a host processor, a processor suitable for processing a task instructed by the host processor, a memory, shared by the host processor and the processor, that is suitable for storing data processed by the host processor and the processor, respectively, and a memory controller suitable for checking whether a stored data processed by the host processor and the processor are reused, and for sorting and managing the stored data as a first data and a second data based on the check result.

18 Claims, 3 Drawing Sheets

OPERATING METHOD OF MEMORY SYSTEM THAT CHECKS STORED DATA THAT IS REUSED AND GENERATING A FLAG/BIT SIGNAL

CROSS-REFERENCE TO RELATED APPLICATION

This application claims priority under 35 U.S.C. § 119 to Korean Patent Application No. 10-2019-0029885 filed on Mar. 15, 2019, which is incorporated herein by reference in its entirety.

BACKGROUND

1. Field

Exemplary embodiments relate to a memory system, and more particularly, to a memory system that shares and uses a memory, and a data processing system including the same.

2. Discussion of the Related Art

A memory system used in a data processing system can be used as a main memory device or secondary memory device. Examples of such a data processing system includes portable electronic devices such as a mobile phone, an MP3 player, a digital camera and a laptop computer or electronic devices such as a desktop computer, a game console, a TV and a projector.

The memory system may store data processed by the data processing system. The memory system may be embedded in and operate in the data processing system, or the memory system may be fabricated in a separate form and coupled to the data processing system. That is, the memory system may be one of various types of storage devices according to an interface protocol coupled to the data processing system. For example, the memory system may be a multimedia card (MMC) such as an embedded MMC (eMMC), a reduced size MMC (RS_MMC) or micro-MMC, a secure digital (SD) card such as a mini-SD card or micro-SD card, a compact flash (CF) card, a smart media card, a memory stick, a universal serial bus (USB) storage device, a universal flash storage (UFS) or a solid state drive (SSD).

SUMMARY

Various embodiments are directed to a memory system capable of sharing a memory by sorting data stored in the memory according to an access pattern of the data.

In accordance with an embodiment of the present disclosure, a data processing system includes: a host processor; a processor suitable for processing a task instructed by the host processor; a memory, shared by the host processor and the processor, that is suitable for storing data processed by the host processor and the processor, respectively; and a memory controller suitable for checking whether a stored data processed by the host processor and the processor are reused, and for sorting and managing the stored data as a first data and a second data based on the check result.

In accordance with another embodiment of the present disclosure, an operating method of a memory system includes storing an input address as a first address; comparing the input address to the first address, and generating a flag signal according to the comparison result; and storing the input address as a second address and allocating a valid bit and a dirty bit to the second address in response to the flag signal.

DETAILED DESCRIPTION

Figure 1:
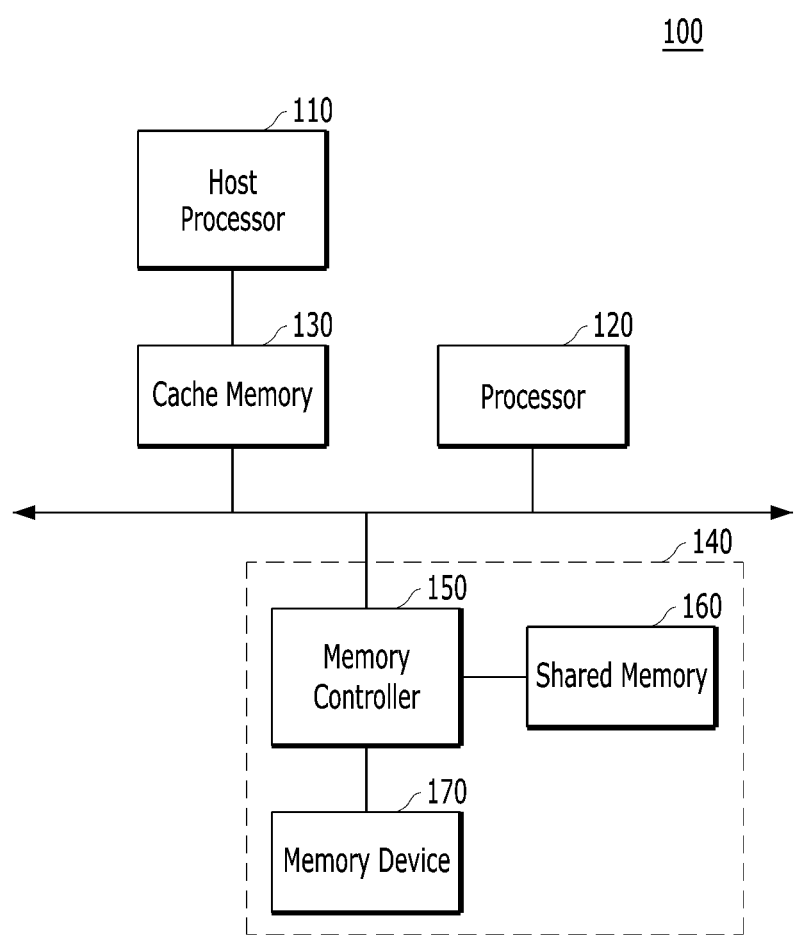
FIG. 1 is a block diagram illustrating a data processing system in accordance with an embodiment of the disclosure.

FIG. 1 is a block diagram illustrating a data processing system 100 in accordance with an embodiment of the disclosure.

Referring to FIG. 1, a data processing system 100 may include a host processor 110, a processor 120, a cache memory 130 and a memory system 140. The memory system 140 may include a memory controller 150, a shared memory 160 and a memory device 170.

The host processor 110 may control overall operations of the data processing system 100. The host processor 110 may process a task by accessing the memory device 170 through the memory controller 150. That is, the host processor 110 may send a request to the memory controller 150 to request a read/write operation of the memory device 170. For example, the host processor 110 may include a central processing unit (CPU) that executes and processes a command in a computer.

The processor 120 may process a task directed by the host processor 110. The processor 120 may process a part of a task performed by the host processor 110, thereby increasing the efficiency of the host processor 110. For example, the processor 120 may include a graphic processing unit (GPU) for performing graphic computation in the computer. However, the present embodiment is not limited thereto, and the host processor 110 and the processor 120 may each include a microprocessor, an application processor, an accelerated processing unit, an operating system and the like.

The cache memory 130 may store data which are frequently used by the host processor 110. The cache memory 130 may include a memory having high data processing speed. For example, the cache memory 130 may include a static random access memory (SRAM).

Although not illustrated in FIG. 1, the data processing system 100 may further include a memory which is dedicated to the processor 120 so as to store data processed by the processor 120. For example, the data processing system 100 may include an SRAM serving as a frame buffer memory for the GPU.

Such an SRAM has high data processing speed, but has a limited capacity of several megabytes (MB). Therefore, with the increase in data processing capacity of the data processing system 100, the cache memory and the frame buffer memory may require a larger capacity. However, the cost for increasing the capacity of the SRAM or an occupied area, depending on the capacity, may be prohibitive.

Therefore, the host processor 110 and the processor 120 may share the shared memory 160 through the memory controller 150. The shared memory 160 may operate as a cache memory of the host processor 110 as well as a frame buffer memory of the processor 120, and store data processed by the host processor 110 and the processor 120, respectively. The shared memory 160 may include a dynamic random access memory (DRAM) having a larger capacity than the SRAM. For example, the shared memory 160 may include a low-power memory having a capacity of 1 to 2 gigabytes (GB). The operations of the memory controller 150 and the shared memory 160 will be described in more detail with reference to FIG. 2.

The memory device 170 may perform operations such as read/write operations and the like under control of the memory controller 150. The memory device 170 may receive a command and address from the memory controller 150, and transmit and receive data to and from the memory controller 150. The memory device 170 may be one of various types of memories such as a DRAM, NAND Flash, resistive random access memory (RRAM), phase-change random access memory (PCRAM), magnetic random access memory (MRAM), and ferroelectric random access memory (FRAM) by way of non-limiting examples.

Figure 2:
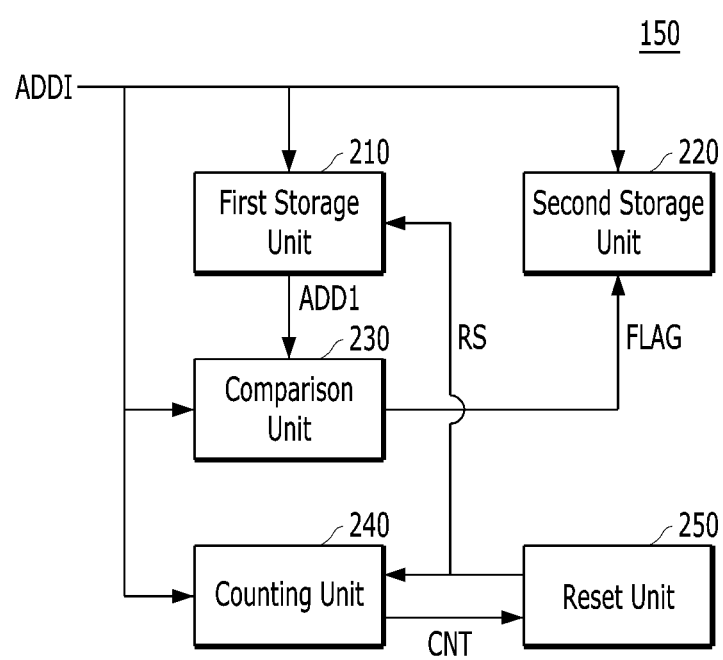
FIG. 2 is a block diagram illustrating an embodiment of a memory controller of FIG. 1 according to an embodiment of the disclosure.

FIG. 2 is a block diagram illustrating a memory controller of FIG. 1 according to an embodiment of the disclosure.

Referring to FIG. 2, the memory controller 150 may include a first storage unit 210, a second storage unit 220, a comparison unit 230, a counting unit 240 and a reset unit 250.

As described above, the host processor 110 and the processor 120 may share the shared memory 160. The memory controller 150 may perform read and write operations and store data in the shared memory 160 for both the host processor 110 and the processor 120. Depending on whether the data stored in the shared memory 160 are reused, the memory controller 150 may manage the stored data as first data (for example, cache data) or manage the stored data as second data (for example, buffer data).

Data requested by the host processor 110 may mainly include cache data. For example, data which are generated through a task performed by the CPU are highly likely to be reused. The memory controller 150 may manage such data as cache data, and the shared memory 160 may operate as a last-level cache memory of the host processor 110. On the other hand, data requested by the processor 120 may mainly include buffer data. For example, data which are generated through graphic computation performed by the GPU may be less likely to be reused. The memory controller 150 may manage such data as buffer data, and the shared memory 160 may operate as the buffer memory of the processor 120. However, the present embodiment is not limited thereto.

The first storage unit 210 may store an input address ADDI requested by the host processor 110 or the processor 120 as a first address ADD1. The first storage unit 210 may provide the stored first address ADD1 to the comparison unit 230. In response to a reset signal RS generated by the reset unit 250, the first storage unit 210 may be reset to delete the stored first address ADD1.

The comparison unit 230 may compare an input address ADDI to a first address ADD1. When the comparison result indicates that the input address ADDI coincides with or is the same as the first address ADD1, the comparison unit 230 may generate a flag signal FLAG. That is, when the input address ADDI is re-inputted even once in a predetermined period, the comparison unit 230 may generate the flag signal FLAG.

In accordance with another embodiment, when the comparison result indicates that the input address ADDI coincides with or is the same as the first address ADD1, the comparison unit 230 may increase a flag bit. When the flag bit is increased to a threshold bit or more, the comparison unit 230 may generate the flag signal FLAG. Thus, when the input address ADDI is re-inputted a threshold number of times or more in a predetermined period, the comparison unit 230 may generate a flag signal FLAG.

The input address ADDI may correspond to the data stored in the shared memory 160. In accordance with an embodiment, if the data stored in the shared memory 160 is reused, either once or a threshold number of times or more, in a predetermined period, then the memory controller 150 may sort and manage the corresponding data as cache data. This configuration may be changed depending on circuit design, and the present embodiment is not limited thereto.

In response to the flag signal FLAG, the second storage unit 220 may store the input address ADDI as a second address ADD2. The memory controller 150 may manage data of the shared memory 160, corresponding to the second address ADD2 stored in the second storage unit 220, as cache data. Therefore, a valid bit and a dirty bit may be allocated to the second storage unit 220 in response to the second address ADD2. The configuration of the second storage unit 220 will be described in more detail with reference to FIG. 3.

The counting unit 240 may perform a counting operation in response to the input address ADDI. Whenever the input address ADDI is inputted, the counting unit 240 may increment a count value CNT and output the increased count value CNT to the reset unit 250. In response to the reset signal RS generated by the reset unit 250, the count value CNT of the counting unit 240 may be reset to an initial value.

The reset unit 250 may compare the increased count value CNT to a threshold value TH. When the increased count value CNT reaches the threshold value TH, the reset unit 250 may generate the reset signal RS. At this time, the threshold value TH may correspond to a maximum queue of read or write commands which the memory controller 150 receives from the host processor 110 and the processor 120. That is, threshold value TH is a measure of the depth of the queue.

Figure 3:
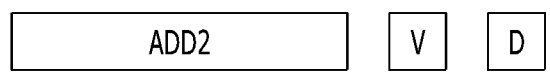
FIG. 3 is a configuration diagram illustrating an embodiment of a storage unit of FIG. 2 according to an embodiment of the disclosure.

FIG. 3 is a configuration diagram illustrating the second storage unit 220 of FIG. 2.

FIG. 3 representatively illustrates one of the second addresses ADD2 stored in the second storage unit 220. Referring to FIG. 3, a valid bit V and a dirty bit D may be allocated to the second storage unit 220 in response to the second address ADD2.

The valid bit V may indicate whether data corresponding to the second address ADD2 has been updated from the memory device 170 into the shared memory 160. That is, when the data has been updated from the memory device 170 into the shared memory 160, the memory controller 150 may activate the valid bit V to a logic level '1'. On the other hand, if the data has not been updated from the memory device 170 into the shared memory 160, the memory controller 150 may activate the valid bit V to a logic level '0'.

The dirty bit D may indicate whether the data corresponding to the second address ADD2 is dirty. When the dirty bit D is activated to the logic level '1', it may indicate that data stored in the shared memory 160 and the memory device 170 do not coincide with each other. When the dirty bit D is deactivated to the logic level '0', it may indicate that the data stored in the shared memory 160 and the memory device 170 coincide with or are identical each other.

That is, the data corresponding to the second address ADD2 may be stored as cache data in the shared memory 160, and the shared memory 160 may operate as a last-level cache memory for the data corresponding to the second address ADD2. Therefore, the memory controller 150 may allocate the valid bit V and the dirty bit D to the data corresponding to the second address ADD2, and manage the valid bit V and the dirty bit D to maintain cache coherency.

Figure 4:
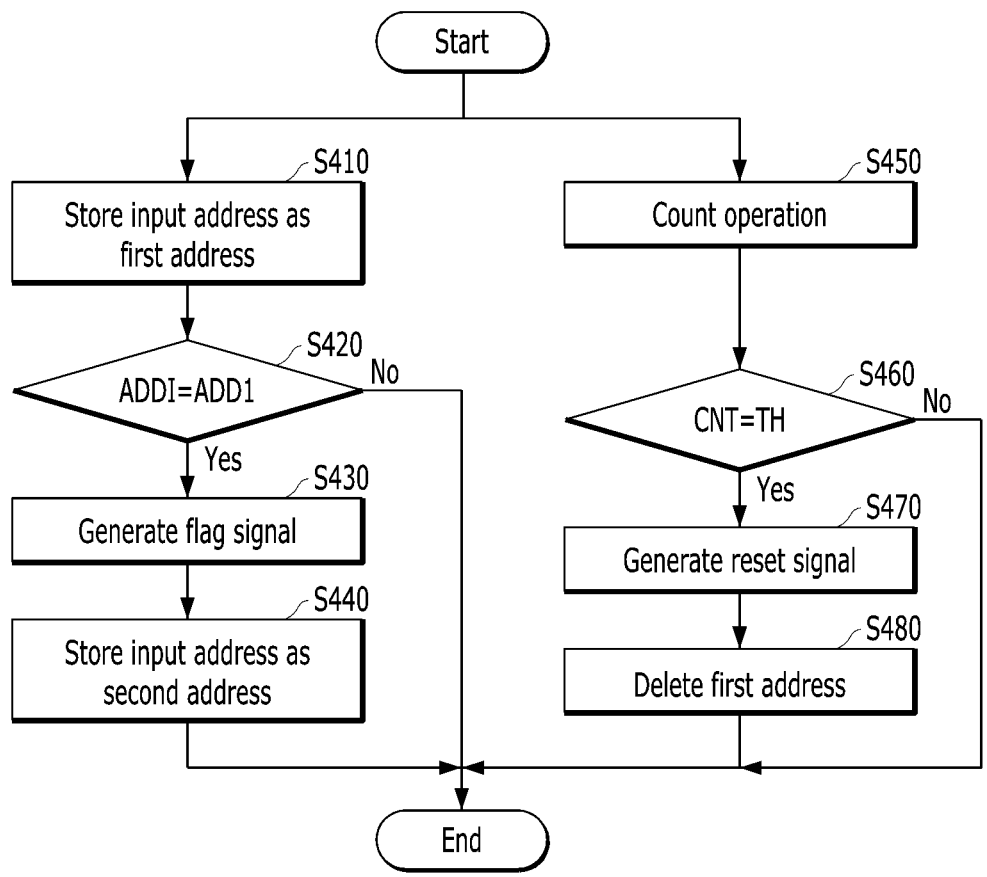
FIG. 4 is a flowchart illustrating an operation of a memory system in accordance with an embodiment of the disclosure.

FIG. 4 is a flowchart illustrating an operation of the memory system 140 in accordance with an embodiment.

Referring to FIG. 4, the first storage unit 210 of the memory controller 150 may store the input address ADDI as the first address ADD1 in step S410. The first storage unit 210 may provide the stored first address ADD1 to the comparison unit 230.

The comparison unit 230 may compare the input address ADDI to the first address ADD1 stored in the first storage unit 210 in step S420. When the comparison result indicates that the input address ADDI coincides with the first address ADD1 (Yes in step S420), the comparison unit 230 may generate the flag signal FLAG in step S430. In accordance with another embodiment, when the comparison result indicates that the input address ADDI coincides with the first address ADD1, the comparison unit 230 may increase the flag bit. When the flag bit is increased to meet or exceed a threshold bit or more, the comparison unit 230 may generate the flag signal FLAG.

In response to the flag signal FLAG, the second storage unit 220 may store the input address ADDI as the second address ADD2 in step S440. In response to the second address ADD2 stored in the second storage unit 220, the valid bit V and the dirty bit D may be allocated. Then, according to requests of the host processor 110 and the processor 120, the memory controller 150 may manage the valid bit V and the dirty bit D. That is, in order to maintain cache coherency, the memory controller 150 may activate or deactivate the valid bit V and the dirty bit D of the second address ADD2 corresponding to the input address ADDI, based on the input address ADDI.

In accordance with the present embodiment, the counting unit 240 may perform a counting operation in response to the input address ADDI in step S450. Whenever the input address ADDI is inputted, the counting unit 240 may increase the count value CNT and output the increased count value CNT to the reset unit 250.

The reset unit 250 may compare the increased count value CNT to the threshold value TH in step S460. When the increased count value CNT reaches the threshold value TH (Yes in step S460), the reset unit 250 may generate a reset signal RS in step S470. At this time, the threshold value TH may correspond to a maximum queue of read or write commands which the memory system 140 receives from the host processor 110 and the processor 120, that is, the depth of the queue.

In response to the reset signal RS generated by the reset unit 250, the first storage unit 210 may be reset to delete the stored first address ADD1 in step S480. Furthermore, in response to the reset signal RS generated by the reset unit 250, the count value of the counting unit 240 may be reset to the initial value.

In accordance with embodiments disclosed herein, the data processing system can sort and manage data stored in the memory as cache data, depending on an access pattern of the data. That is, the data processing system may sort data which is reused, among the data stored in the memory, into the cache data, and manage the cache data in a different manner from the other data. Therefore, since the memory can be shared and used as the cache memory and the buffer memory, the capacity of the cache memory can be increased without an increase in area or degradation in performance in a data processing system including multiple processors.

Although various embodiments have been described for illustrative purposes, it will be apparent to those skilled in the art that various changes and modifications may be made without departing from the spirit and scope of the invention as defined in the following claims.

What is claimed is:

1. A data processing system comprising:
 a host processor;
 a processor suitable for processing a task instructed by the host processor;
 a memory, shared by the host processor and the processor, that is suitable for storing data processed by the host processor and the processor, respectively; and
 a memory controller suitable for checking whether a stored data in the memory is reused, and for sorting and managing the stored data that is reused, as a first data for the host processor, and the stored data that is not reused, as a second data for the processor.

2. The data processing system of claim 1, wherein the memory controller sorts the stored data that is reused within a predetermined period, as the first data, and sorts the stored data that is not reused within the predetermined period, as the second data.

3. The data processing system of claim 1, wherein the memory controller allocates a valid bit and a dirty bit to the first data and manage the first data as cache data.

4. The data processing system of claim 1, wherein the memory controller comprises:
 a first storage unit suitable for storing an input address, requested by the host processor and the processor, as a first address;
 a comparison unit suitable for comparing the input address to the first address, and for generating a flag signal according to the comparison result; and
 a second storage unit suitable for storing the input address as a second address in response to the flag signal.

5. The data processing system of claim 4, wherein the memory controller comprises:
 a counting unit suitable for increasing a count value in response to the input address; and
 a reset unit suitable for generating a reset signal when the count value reaches a threshold value.

6. The data processing system of claim 5, wherein the counting unit and the first storage unit are reset in response to the reset signal.

7. The data processing system of claim 5, wherein the threshold value corresponds to a depth of a queue of the memory controller.

8. The data processing system of claim 4, wherein when the comparison result indicates that the input address coincides with the first address, the comparison unit increases a flag bit corresponding to the first address.

9. The data processing system of claim 8, wherein when the flag bit is increased to a threshold bit or more, the comparison unit generates the flag signal.

10. The data processing system of claim 1, wherein the memory is shared as a last-level cache memory of the host processor and a buffer memory of the processor.

11. The data processing system of claim 1, wherein the memory comprises a dynamic random access memory (DRAM) having a capacity of 1 to 2 gigabytes.

12. An operating method of a memory system, comprising:

storing data processed by a host processor and a processor, respectively, in a memory shared by the host processor and the processor;

storing an input address, corresponding to a stored data in the memory, as a first address;

comparing an input address to the first address, and generating a flag signal according to the comparison result; and storing the input address compared to the first address as a second address and allocating a valid bit and a dirty bit to the second address in response to the flag signal.

13. The operating method of claim 12, further comprising:
increasing a count value in response to the input address; and
generating a reset signal when the increased count value reaches a threshold value.

14. The operating method of claim 13, further comprising:
deleting the first address in response to the reset signal; and
resetting the count value to an initial value in response to the reset signal.

15. The operating method of claim 13, wherein the threshold value corresponds to a depth of a queue of the memory system.

16. The operating method according to claim 12, wherein the generating of the flag signal comprises:
increasing a flag bit when the comparison result indicates that the input address coincides with the first address; and
generating the flag signal when the flag bit is increased to a threshold bit or more.

17. The operating method of claim 12, further comprising activating or deactivating the allocated valid bit and dirty bit of the second address based on the input address.

18. The operating method of claim 12, wherein the memory system comprises a dynamic random access memory (DRAM) having a capacity of 1 to 2 gigabytes.

* * * * *